United States Patent [19]
Guerid

[11] Patent Number: 4,962,839
[45] Date of Patent: Oct. 16, 1990

[54] DUCTING FOR TRANSPORTING GRANULAR OR POWDER SUBSTANCES UNDER GRAVITY, IN PARTICULAR ON SITES HAVING SILOS

[75] Inventor: Michel Guerid, Chemille, France

[73] Assignee: Guery S.A.R.L. (Societe a Responsabilite Limitee), France

[21] Appl. No.: 356,117

[22] Filed: May 24, 1989

[30] Foreign Application Priority Data

Jun. 3, 1988 [FR] France .................. 88 07455

[51] Int. Cl.[5] ............................ B65G 11/16
[52] U.S. Cl. .................. 193/2 R; 193/2 A; 193/32; 193/1; 138/36; 138/39; 138/44; 138/159
[58] Field of Search ............ 193/2 R, 2 A, 32, 1; 138/36, 37, 39, 44, 40, 156, 157, 158, 159, 163, 1

[56] References Cited

U.S. PATENT DOCUMENTS

| | | | |
|---|---|---|---|
| 2,752,950 | 7/1956 | Coulters | 138/159 |
| 2,873,048 | 2/1959 | Gear | 193/32 |
| 3,089,521 | 5/1963 | Paiement | 138/158 |

FOREIGN PATENT DOCUMENTS

| | | | |
|---|---|---|---|
| 201286 | 10/1907 | Fed. Rep. of Germany | 138/36 |
| 1152950 | 8/1963 | Fed. Rep. of Germany | 138/36 |
| 2411355 | 7/1979 | France . | |
| 2080474 | 2/1982 | United Kingdom . | |

Primary Examiner—H. Grant Skaggs
Assistant Examiner—D. Glenn Dayoan
Attorney, Agent, or Firm—Thomas W. Speckman; Douglas H. Pauley

[57] ABSTRACT

An elementary length of the ducting comprises a pair of top and bottom plane panels (2, 3) and a pair of side panels (4, 5) having outwardly projecting longitudinal rims (8, 9, 12, 13) on their outside faces, the margins (10, 11, 14, 15) of the top and bottom panels (2, 3) and the rims (8, 9, 12, 13) of the side panels (4, 5) are predrilled to receive fixing bolts (6). A detection panel (47) is disposed as an inside lining of the bottom panel (3) and is connected via its own rims (48, 49) to the side panels (4, 5), and a tunnel (52) is left between the bottom panel (3) and the detection panel (47), with said tunnel opening out into the ducting, close to a bend.

21 Claims, 6 Drawing Sheets

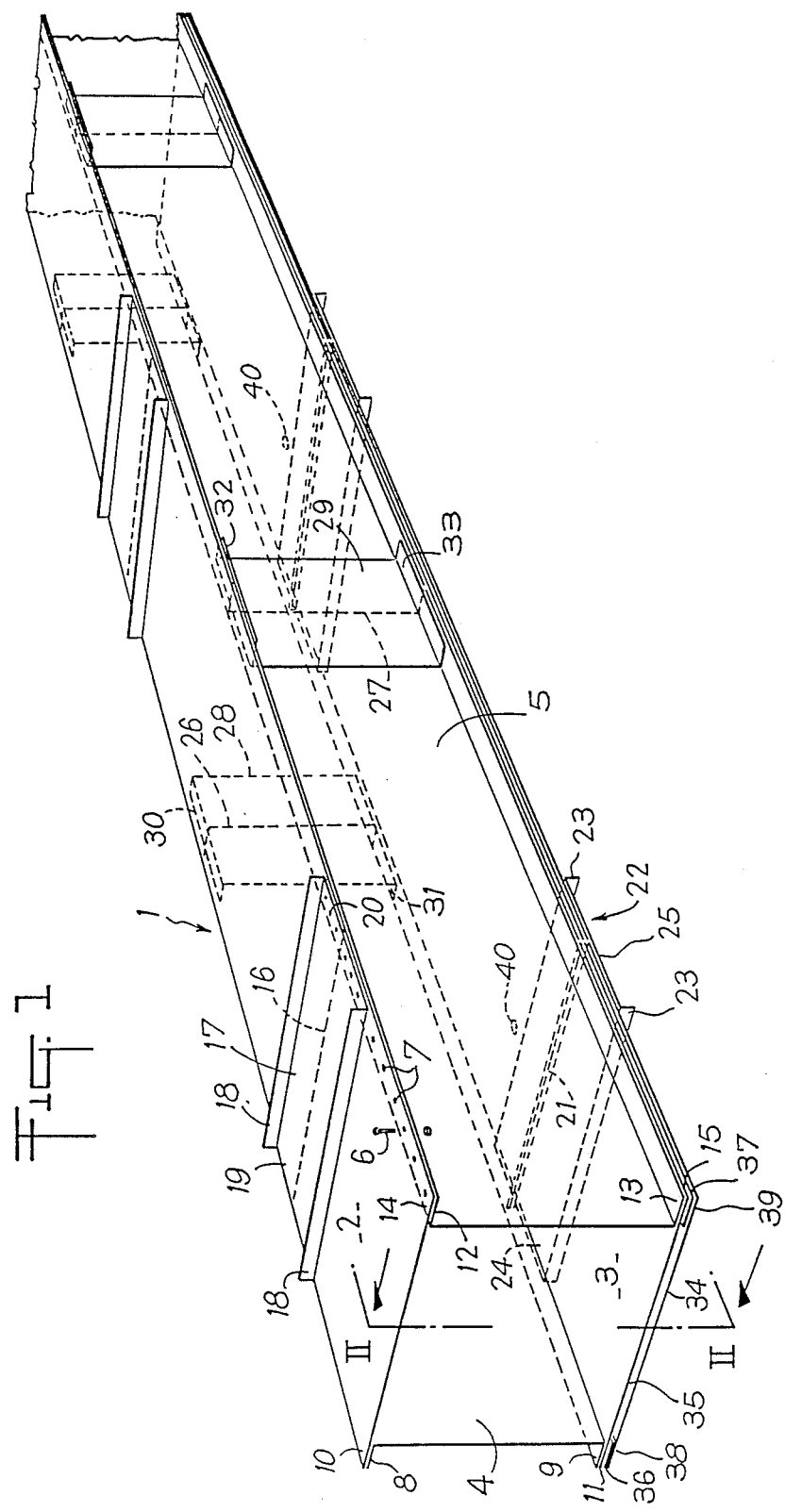

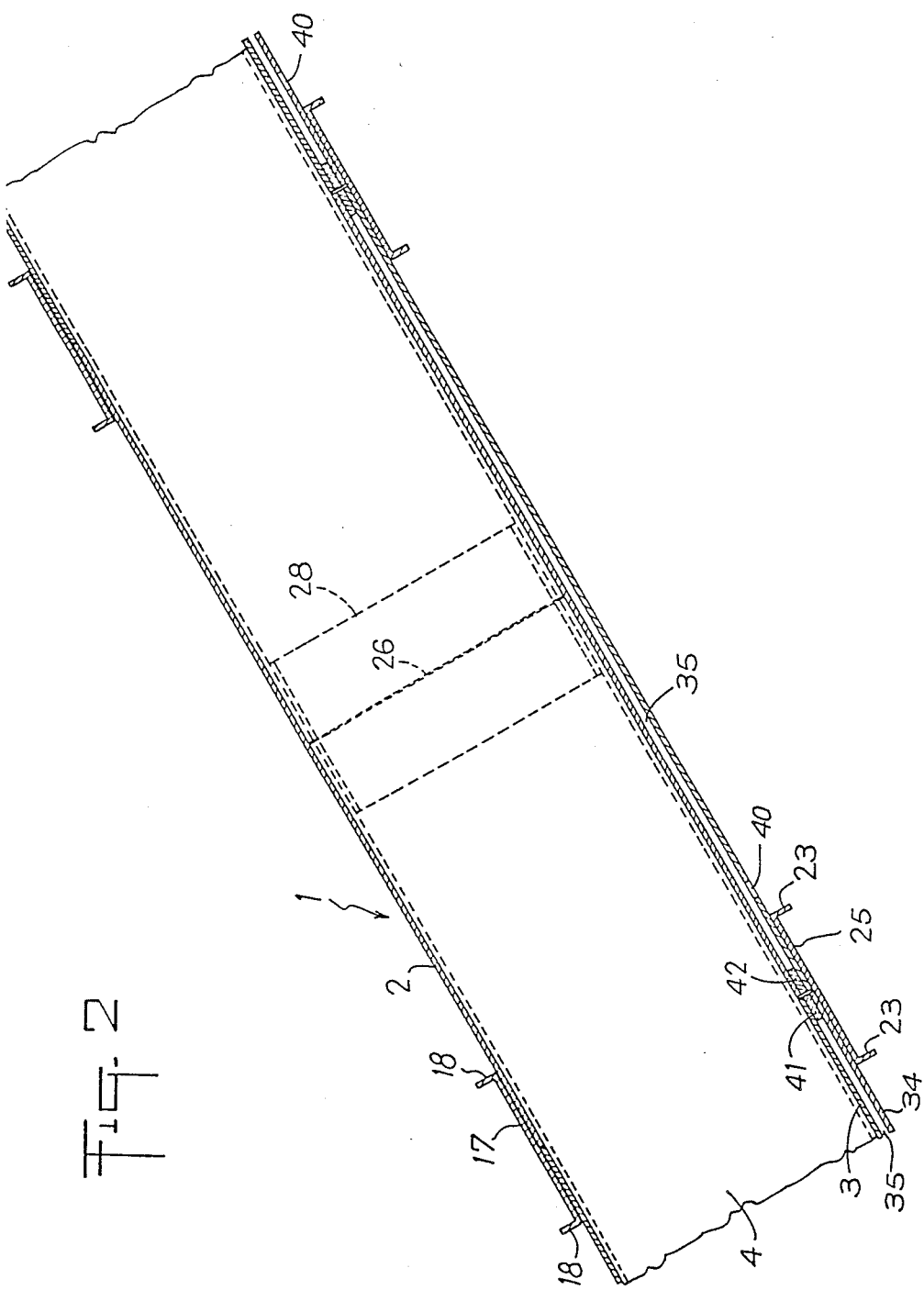

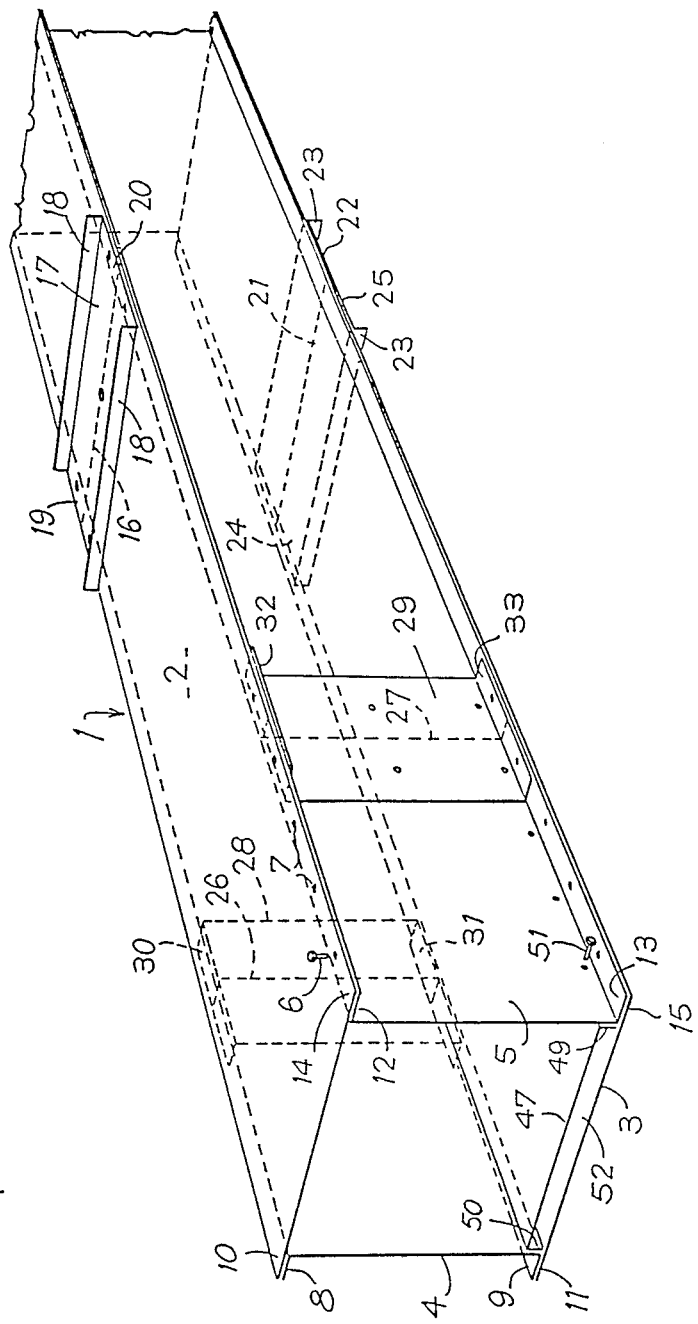

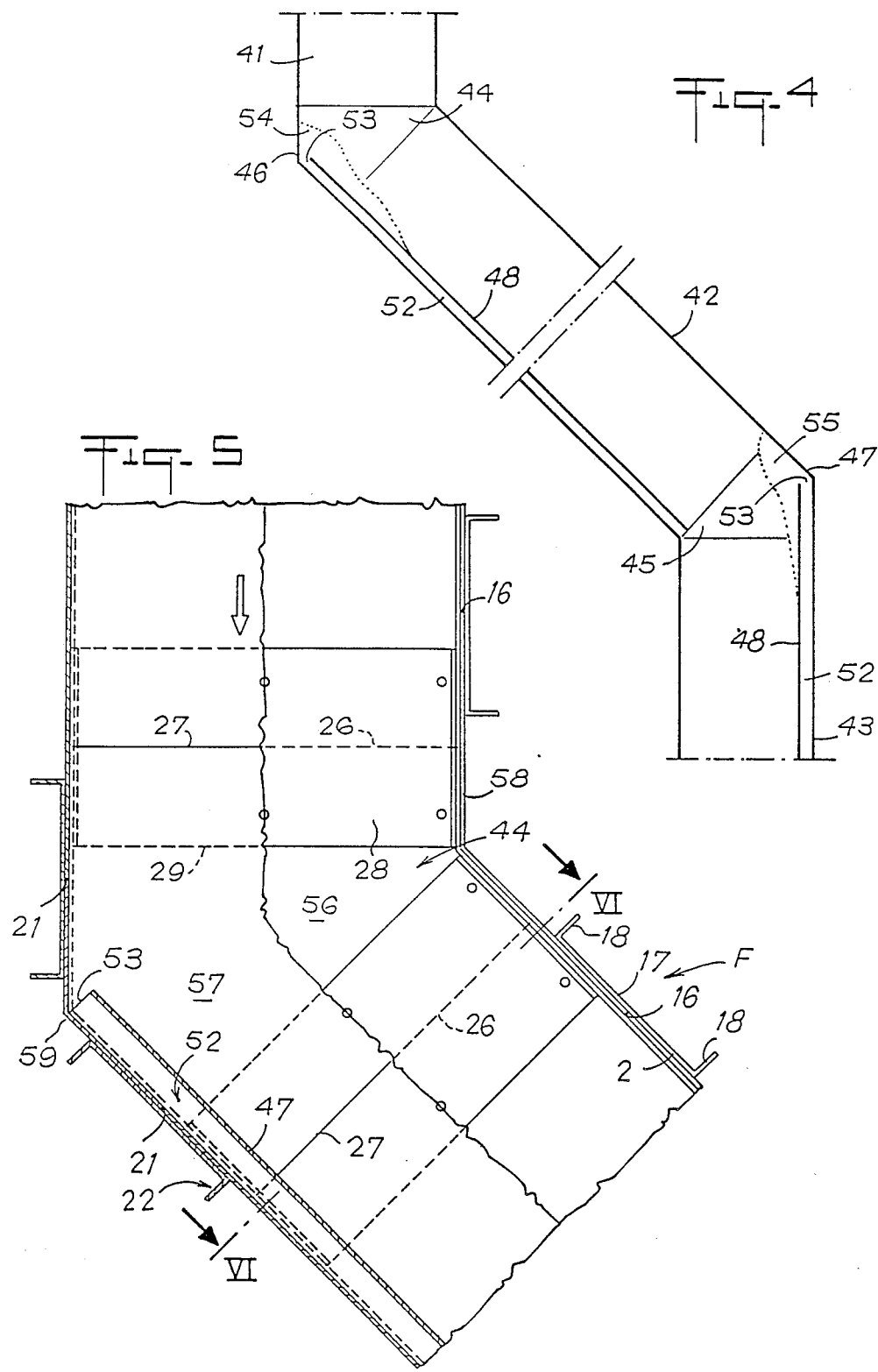

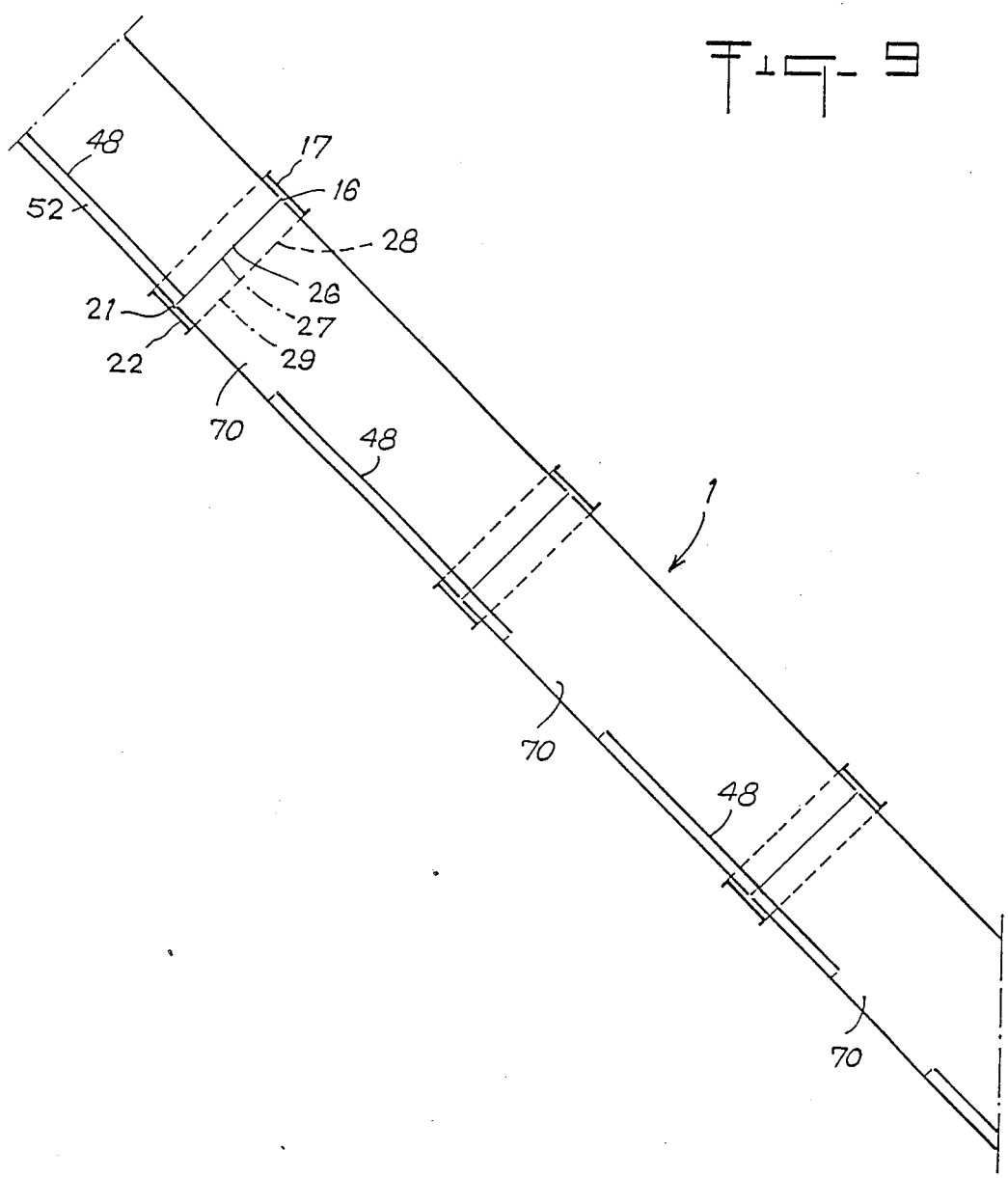

DUCTING FOR TRANSPORTING GRANULAR OR POWDER SUBSTANCES UNDER GRAVITY, IN PARTICULAR ON SITES HAVING SILOS

The present invention relates to ducting for transporting granular or powder substances under gravity, in particular on sites where there are grain silos.

BACKGROUND OF THE INVENTION

In general, such ducting is used for connecting one or more silos to installations such as port installations for loading or unloading the holds of ships.

The ducting is generally built up from interconnected cylindrical tubular elements. Given that these elements are heavy because of their thickness, they are difficult to assemble and replace, particularly when the ducting passes through empty space at great height, making it necessary to use large hoisting means.

Assembly and maintenance work is therefore dangerous and expensive.

In addition, the tubular elements are interconnected by welding. If a worn element is to be replaced, there is a real danger of explosion since the mixture inside the ducting and the silos is explosive, as is well known.

Quite apart from that, the circular cross-section of the ducting is relatively small to enable handling and assembly to be performed without using excessively large means.

As a result the throughput along the ducting is limited, causing ships to be held up for too long a period of time, which is expensive.

Finally, when a leak appears, due to wear since grain is abrasive, the faulty element must be replaced without waiting and as quickly as possible. This presents a real problem of making a tailor-made replacement element and of installing it on site.

The object of the present invention is to remedy these drawbacks:

by proposing a manner of construction whereby the flow cross-section can be considerably increased without requiring exceptional means for assembling or replacing elements;

by replacing welding which is dangerous with a manner of assembly that does not run the risk of explosion and which is easy to implement on site, without danger;

by standardizing the components of the ducting so that they are stockable and can be immediately available; and by providing means for overcoming the consequences of wear on some of the panels.

U.S. Pat. No. 2 752 950 describes ducting for ventilating and heating purposes in which each length is constituted by four panels, with the top and bottom horizontal panels being plane while the two vertical panels have S-shaped rims protecting inwardly for engaging on the margins of said top horizontal panels. In addition, the rims of the vertical panels are fixed to the margins of the horizontal panels by screws.

This prior art ducting is not subject to the risk of explosion, nor is it subject to the constraints of ducting repair as is the ducting of the present application, and as a result it suffers from numerous drawbacks.

In particular, the panel fixing means are only partially accessible, thereby making disassembly difficult, and if the fixing means jam they must be destroyed which may damage the panels. In addition, the disassembly of one panel is necessarily accompanied by at least partial disassembly of adjacent panels. Further, sealing at the junction between panels in a given length and between panels in contiguous lengths is not provided to satisfactory safety standards applicable to ducting for transporting grains or other substances. Above all, no means are described or suggested for countering the risk of wear.

While aiming for the above-mentioned object, the present invention naturally seeks to remedy these drawbacks of the prior art ducting insofar as it implements the combination of means used in the ducting taught by U.S. Pat. No. 2 752 950, whereby an elementary length of the ducting is constituted by four independent panels comprising an opposite pair of panels which are plane and two other panels having rims applied against the margins of the plane panels and predrilled as are said margins in order to pass fixing means passing from the outside through the margins and the rims after they have been put into contact.

SUMMARY OF THE INVENTION

For the object specified above and in accordance with the invention:

the rims are coplanar and project outwards in order to enable any one of the panels to be removed while leaving the other panels assembled;

the fixing means, such as bolts, have both ends accessible from the outside; and the panel situated in an abrasion zone co-operates with an additional panel which runs substantially parallel thereto in order to form a tunnel so that the effects of wear are considerably attenuated.

Advantageously, the panels having rims are the side panels.

In a first embodiment, the additional panel participating in constituting the tunnel is disposed outside the bottom panel subjected to wear and is connected thereto by the fixing means for the side panels, with the empty space of the tunnel provided between those panels being put into communication with the outside via at least one passage through the outer panel, referred to as the "detection panel".

Longitudinal and transverse spacer strips are interposed between each detection panel and the corresponding bottom panel in order to provide the above-mentioned empty space.

In a second embodiment, the additional panel participating in the constitution of the tunnel, and referred to as the "wear panel", is disposed as an inner lining over the panel most subject to wear in such a manner that rims on the additional panel come into abutment against said panel most subject to wear and are connected to the side panels by the fixing means, said panels thus forming a tunnel whose top opening opens out close to a bend in the ducting to be protected.

When the length to be protected after the bend is at a lesser slope, the panel of the ducting protected by the wear panel is the bottom panel.

When the length to be protected after the bend is at a greater slope, the panel of the ducting protected by the wear panel is the top panel.

The additional panels may touch one another; however, passages may be provided between the slow flow rate tunnel and said high flow rate ducting in order to slow down said high flow rate by turbulence, said passages being delimited by spacing at least some of the panels delimiting the inside of said tunnel apart from one another.

In an advantageous embodiment, the aligned panels of the top face and of the bottom face are interconnected in pairs by means of respective joint-covering channel section members overlying the joints between the panels so that the rims of said members extend parallel to the joints and perpendicularly to said panels, with the ends of said joint-covers being fixed to said panels and the rims of the side panels by the bolts used for interconnecting them.

The aligned side panels are interconnected in pairs by means of joint-covering channel section members disposed on either side of the joints between said panels in such a manner that the rims of said joint-covering members are pressed against the rims of said side panels and are fixed thereto by the bolts interconnecting the panels.

The joint-covering members of all of the panels may be situated facing one another.

The joint-covering members of the panels in the top face also may be disposed facing the joint-covering members of the panels in the bottom face, and in a staggered configuration relative to the facing joint-covering members of the side panels.

The joint-covering members of the top face panels may be disposed in a staggered configuration relative to the jointcovering members of the panels in the bottom face, and in a staggered configuration relative to the facing joint-covering members of the side panels.

Sealing means such as grease, a run of foam, or of other material, is placed on the small clearance between the ends of two contiguous panels that are in line, and between said panels and the joint-covering member.

Sealing means such as grease, a run of foam, or of other material, is interposed between the rounded fold lines in the panels and those of the joint-covering members.

Sealing means such as grease, a run of foam, or of other material, is interposed between each rim and the contiguous plane panel.

Under these conditions, each panel can be disassembled independently of the others, very easily and very quickly under the dangerous conditions due to their installation at a height in silos, while the remainder of the ducting retains its stiffness and may be left in place without additional support. Further, the ducting is completely sealed and the risk of explosion is practically completely eliminated. Above all, panel wear by grain or any other substance flowing in the ducting is considerably reduced, and when it does occur, repair can wait for a convenient moment, i.e. when the silo not in use.

BRIEF DESCRIPTION OF THE DRAWINGS

Embodiments of the invention are described by way of example with reference to the accompanying drawings, in which:

FIG. 1 is a perspective view showing a first embodiment of ducting in accordance with the invention;

FIG. 2 is a longitudinal section on line II—II of FIG. 1;

FIG. 3 is a view similar to FIG. 1, showing a second embodiment of ducting in accordance with the invention;

FIG. 4 is a diagrammatic section through ducting having two bends and implementing the second embodiment as shown in FIG. 3;

FIG. 5 is a half section and a half elevation view similar to FIG. 4 showing a practical embodiment of the upstream bend of FIG. 4 on a larger scale;

FIG. 9 is an elevation section through a variant embodiment.

DETAILED DESCRIPTION

Figure 6:
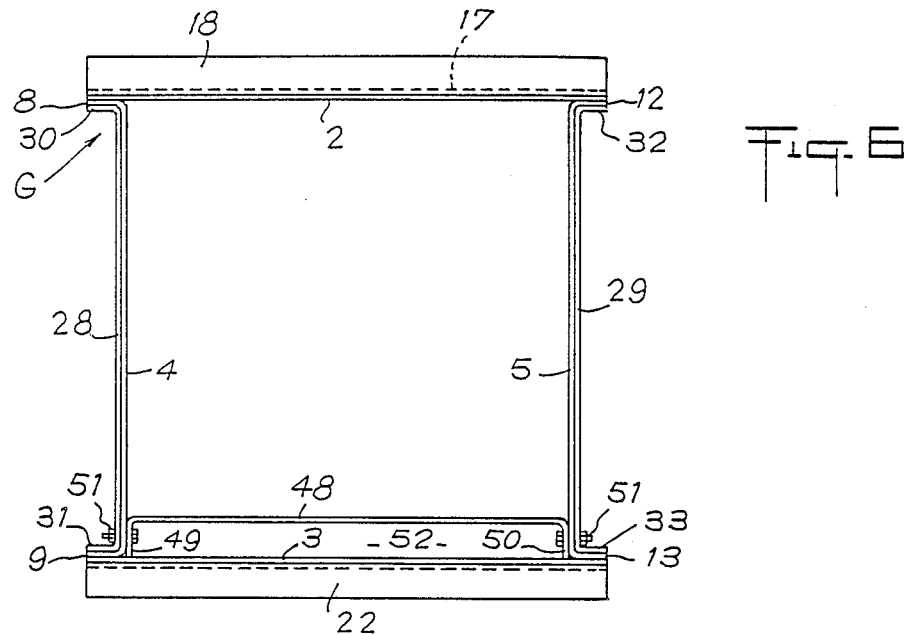
FIG. 6 is a cross-section on line VI—VI of FIG. 5.

The ducting is polygonal in section so as to be suitable for constructing as an assembly of plane panels.

In the embodiments shown in the drawings, the cross-ssection is square, but it could be rectangular.

The ducting 1 is constituted by a top alignment of plane panels 2, a bottom alignment of plane panels 3, a left side alignment (FIG. 1) of plane panels 4, and a right side alignment of plane panels 5. The top and bottom panels 2 and 3, including their assembly means, are identical to each other and consequently they may be interchanged. Similarly, the left and right side panels 3 and 4 are identical and may be interchanged.

In order to assemble the panels to one another, means which are inert relative to explosion are implemented, said means being suitable for being assembled and disassembled easily and quickly from the outside. In the example chosen by way of preferred, but non-limiting example, the assembly means are bolts 6 passing through co-inciding holes 7 drilled in each longitudinal margin of a panel 2 or 3 and in a corresponding rim of the contiguous panel 4 or 5, defining an edge of the ducting. In order to enable the bolts or other fixing means such as rivets, shafts with locking levers, or with overcenter devices, etc. to be assembled and disassembled from outside the ducting, each rim is directed outwards.

In the embodiments shown, each side panel 4 has two longitudinal rims 8 and 9 having respective margins 10 and 11 of the corresponding top and bottom panels 2 and 3 pressed thereagainst. Similarly, each side panel 5 has two longitudinal rims 12 and 13 against which respective margins 14 and 15 of the top and bottom panels 2 and 3 are pressed.

The panels 2 in the top alignment are placed end-to-end so that their contacting ends form a joint 16. Two contiguous panels 2 are assembled together with a joint-cover 17 disposed symmetrically over the joint 16. The joint-cover 17 is a channel section member having rims 18 which project upwards and which run parallel to the joint 16. The joint cover 17 is placed over the contiguous panels 2 and its margins 19 and 20 running perpendicular to the rims 18 are fixed to said panels 2 by the same bolts as connect the margins 10 and 14 thereof to the rims 8 and 12 of the side panels 4 and 5.

Similarly, the panels 3 of the bottom alignment have joints 21. These joints are covered by joint-covers 22 which are entirely identical to the covers 17 and which include fixing margins 24 and 25 and rims 23 projecting downwards.

The panels 4 in the lefthand side alignment are placed end-to-end so as to form 26, and the panels 5 of the righthand side alignment are likewise disposed end-to-end so as to form 27. These 26 and 27 are covered by respective covers 28 and 29 having fixing rims 30 & 31 and 32 & 33 which are pressed against the rims 8 & 9 and 12 & 13 of the side panels 4 and 5 and which are fixed to the four panels by means of the bolts at the same places.

In order to improve the stiffness of the assembly, it may be advantageous, as shown in FIG. 1. to distribute the 16 and 21 in a staggered relationship relative to the 26 and 27, with the horizontal 16 and 21 facing each other in pairs and with the vertical 26 and 27 likewise facing each other in pairs. In other words, each side panel is disposed astride the between two pairs of contiguous top and bottom panels and has equal halves extending on either side thereof.

The stiffness of the ducting can be further improved, as can be seen in FIG. 5, by distributing the horizontal 16 and 21 in a staggered relationship relative to each other and in a staggered relationship relative to the vertical 26 which may continue to be disposed opposite vertical 27.

The first embodiment of the ducting as shown in FIGS. 1 and 2 makes use of a device for detecting that the bottom panels 3 have been worn through. This device comprises a detection panel 34 disposed as an outer lining over each bottom panel 3 at a sufficient distance therefrom to delimit an empty space 35. To this end, longitudinal spacer strips 36 and 37 are interposed between the margins 11 and 12 of the bottom panel 3 and the margins 38 and 39 of the detection panel 34. The detection panel 34 and the strips 36 and 37 are fixed to the ducting by means of at least some of the bolts which interconnect the bottom panel 3 to the rims 9 and 13 of the side panels 4 and 5.

In addition, at least one hole 40 (FIG. 2) is made through the detection panel 34, preferably close to one of its ends so as to be located at a low point of a sloping length of ducting. Advantageously, transverse strips 41 and 42 are fixed to the ends of the detection panels 34 so as to divide up the empty space of the bottom alignment into the same number of compartments as there are panels 3.

If a hole is worn through a bottom panel 3, then the granular substance conveyed by the ducting enters the empty space compartment 35 into which the opening leads, and as a result it falls out via the hole 40. This leak warns maintenance personnel that the panel needs replacing, and since the leakage rate is low, it is possible to stop up the hole 40 temporarily while leaving adequate time to obtain a replacement for the worn panel and then to replace it while the installation fitted with the ducting is not actually in use.

The second embodiment of ducting shown in FIGS. 3 to 8 implements a device for reducing the wear on those panels which are most subjected to abrasion by grain. As can be seen more clearly in the diagram of FIG. 4, the ducting 1 comprises three lengths 41 to 43 having an intermediate length 42 at a less steep slope connected by means of an upstream bend 44 to a substantially vertical inlet length 41 and by a downstream bend 45 to a substantially vertical outlet length 43. The base 46 of the upstream bend 43 and the plane bottom panel 3 of the intermediate length 42 need to be protected since the change in direction of the flow gives rise to abrasion in this zone, and similarly, the top 47 of the downstream bend 45 and the plane top panel 2 of the outlet length 43 also need to be protected.

This protection for the upstream bend 44 is described below with reference to FIGS. 3 to 8. The ducting 1 of the length 41 includes a wear panel 48 having rims 49 and 50 like the side panels 4 and 5. The wear panel 48 is disposed inside the ducting so that its rims 49 and 50 come into abutment against the bottom plane panel 3 and they are pressed against the side panels 4 and 5 to which they are fixed by means of bolts 51.

A tunnel 52 is delimited between these panels 48 and 3, said tunnel having a small, generally flat cross-section in which the rate of flow of the grain is much smaller than its rate of flow within the main part of the ducting. As a result, corrosion is attenuated and the rate at which the panel 3 is worn is reduced. In addition, the top opening 53 of the tunnel 52 opens out close to the base 46 of the upstream beam 43 and as a result grain piles up at this location, thereby forming a buffer 54 preventing the grain falling down the length 41 from striking and wearing said base 46 of the bend 44. The same phenomenon occurs for the tunnel 52 of the length 43, which tunnel has an opening 53 close to the top 47 of the downstream bend 45. A buffer 55 builds up at this top end and prevents the grain from wearing the bend 45.

FIG. 5 shows that the bend 44 comprises two identical flanks 56 and 57 in the form of two rectangular trapeziums interconnected by their sloping sides so that their parallel sides form an obtuse angle corresponding to the angle between the lengths 41 and 42. These flanks 56 and 57 extend between respective joints 26 and 27. The bend 44 also includes a top 58 extending between the joints 16 and a bottom 59 extending between joints 21 with said top and bottom forming a V at the above-mentioned angle.

In this second embodiment, the joints 16, 21, 26, and 27 in opposite faces are situated facing each other, whereas the joints 16, 21, 26, and 27 in contiguous faces are disposed in a staggered configuration.

Naturally, and as can be seen in FIG. 9, these joints between the four faces could be situated facing one another in a common transverse plane.

In addition, the flow of substance along the duct per se accelerates by virtue of the change of level in the duct. It is advantageous to limit the flow speed by causing the flow to slow down at various suitably selected points along the flow.

To this end, and with reference to the second embodiment shown in FIGS. 3 to 8, the wear panels 48 are not disposed to touch end-to-end, but are spaced apart from one another as a function of the configuration of the installation and of the result which is to be obtained. In the example shown, each panel 48 is spaced apart from the following panel, thereby leaving a passage 70 providing communication between the ducting in which the substance is flowing at high speed and the tunnel 52 in which the substance is flowing at low speed. Thus, turbulence is set up over each passage 70, thereby slowing down and stabilizing the flow along the ducting.

In this non-limiting example, the panels are 1 meter (m) long and they are individually separated from one another by passages which are 0.4 m long. In this disposition, the wear panels 48 overlie the above-mentioned joints of the panels 2 to 5, thereby stiffening the structure.

Naturally, two or more wear panels 48 may come into contact, thereby increasing the spacing between passages 70 and thus increasing the spacing between turbulent zones for slowing down purposes. In addition, the passages may be of various different lengths.

Naturally, turbulence passages 70 may also be set up in the first embodiment as shown in FIGS. 1 and 2, between the tunnel 35 and the ducting 1 In this case, the detection panels 34 are contiguous while the bottom panels 3 are spaced apart in order to provide said passages.

All of the assembly between bends and lengths is provided by means of rims, joint-covers, and bolts. In order to ensure good sealing and reduce the risks of explosion, sealing gaskets are provided.

Figure 7:
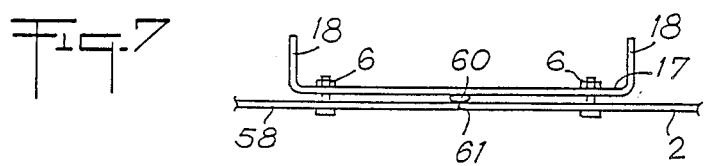
FIG. 7 is a section on a larger scale showing a detail designated by arrow F in FIG. 5.

For example, FIG. 7 shows a run of foam 60 constituting a sealing gasket and placed over the small amount of clearance 61 between two contiguous panels disposed end-to-end, and in particular the plane top panel 2 and the sloping top 58. This run is compressed between said panels and the corresponding joint cover 17, in particular.

Figure 8:
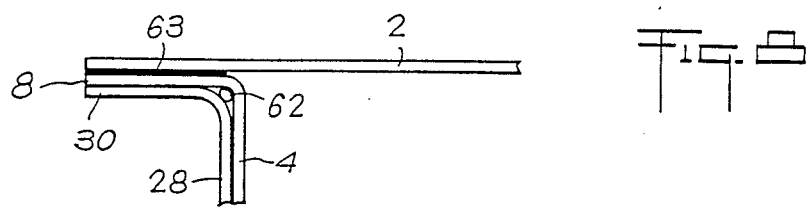
FIG. 8 is a section on a larger scale of a different detail designated by arrow G in FIG. 6.

FIG. 8 shows a run of foam 62 constituting a sealing means interposed between the inside small radius curve interconnecting each rim to its panel and the larger radius outside curve interconnecting each rim to its joint-cover, e.g. between the rounded curve connecting rim 8 to the panel 4 and the rounded curve connecting rim 30 to the joint cover 28.

This FIG. 8 shows that a layer of grease 63 constituting a sealing means is interposed between each rim and the contiguous plane panel, e.g. between the rim 8 of the side panel 4 and the top panel 2.

Ducting as described above is thus easy to assembly and maintain. Heavy hoisting equipment is no longer required and if gangways are coupled to the ducting, as is intended, then there is no danger of personnel falling. The danger of explosion is avoided. The flow cross-section for grain may be as large as desired. In the event of a leak, the installation need be taken out of service only during periods when not actually in use.

I claim:

1. In ducting having a quadrangular crosssectional area and forming a duct chamber for transporting granular substances by gravity, the ducting comprising a pair of opposed flat panels and a pair of opposed channel panels having rims contacting margins of the flat panels and a plurality of fixing means passing from the outside through the margins and the rims after being placed in contact, the improvement comprising:
    said rims being coplanar and projecting outward in order to enable removal of any one of said panels while leaving the other panels assembled;
    said fixing means accessible from outside said ducting; and
    one of said panels situated in an abrasion zone cooperating with an additional panel substantially parallel thereto forming a tunnel therebetween for attenuating effects of wear.

2. In ducting according to claim 1, wherein said channel panels are side panels and said flat panels are top and bottom panels forming said duct chamber.

3. In ducting according to claim 1, wherein one end of said fixing means extends beyond said flat panel margin and the opposite end of said fixing means extends beyond said channel panel rim and both ends of said fixing means are accessible from outside said ducting.

4. In ducting according to claim 1 wherein said additional panel is disposed outside said panel in said abrasion zone and is connected thereto by said fixing means forming a tunnel between said panel in said abrasion zone and said additional panel, said tunnel in communication with the outside by at least one hole through said additional panel.

5. In ducting according to claim 4 wherein longitudinal and transverse spacer strips are positioned between said additional panel and said panel in said abrasion zone to provide closed space in said tunnel.

6. In ducting according to claim 4 wherein a plurality of said additional panels abut one another at their ends.

7. In ducting according to claim 4 wherein passages are provided between said tunnel providing a slow flow rate and said ducting providing a high flow rate to slow down the high flow rate by turbulence, said passages formed by spacing at least some of said panels delimiting the inside of said tunnel apart from one another.

8. In ducting according to claim 1 wherein said additional panel is disposed inside said panel in said abrasion zone, said additional panel having extending edge flanges which abut said panel in said abrasion zone and is connected to adjacent panels by fixing means, forming a tunnel between said panel in said abrasion zone and said additional panel.

9. In ducting according to claim 8 wherein said tunnel has an open end close to a bend in the ducting to be protected.

10. In ducting according to claim 9 wherein said panel in said abrasion zone is downstream from said bend and is at a lesser slope, and said panel in said abrasion zone is a bottom panel.

11. In ducting according to claim 9 wherein said panel in said abrasion zone is downstream from said bend and is at a greater slope, and said panel in said abrasion zone is a top panel.

12. In ducting according to claim 8 wherein a plurality of said additional panels abut one another at their ends.

13. In ducting according to claim 8 wherein passages are provided between said tunnel providing a slow flow rate and said ducting providing a high flow rate to slow down the high flow rate by turbulence, said passages formed by spacing at least some of said panels delimiting the inside of said tunnel apart from one another.

14. In ducting according to claim 2 wherein adjacent said top panels and adjacent said bottom panels are interconnected in pairs with joint-overlying channel section members overlying joints between said panels in such a manner that the legs of said channel section members extend parallel to the joints and perpendicular to said panels, the ends of said joint-covering channel section members being fixed to said panels and said rims of said channel panels by said fixing means.

15. In ducting according to claim 2 wherein adjacent said side panels are interconnected in pairs with jointoverlying channel section members overlying joints between said panels in such a manner that the legs of said channel section members abut said rims of said channel panels and are secured by said fixing means.

16. In ducting according to claim 14 wherein adjacent said side panels are interconnected in pairs with jointoverlying channel section members overlying joints between said panels in such a manner that the legs of said channel section members abut said rims of said channel panels and are secured by said fixing means, and said joint-overlying channel section members of four said panels are aligned facing each other.

17. In ducting according to claim 14 wherein adjacent said side panels are interconnected in pairs with joint-overlying channel section members overlying joints between said panels in such a manner that the legs of said channel section members abut said rims of said channel panels and are secured by said fixing means, and said joint-overlying channel section members of said top and bottom panels are aligned opposite each other and are staggered relative to said joint-overlying channels of said panels.

18. In ducting according to claim 14 wherein adjacent said side panels are interconnected in pairs with joint-overlying channel section members overlying joints between said panels in such a manner that the legs of said channel section members abut said rims of said channel panels and are secured by said fixing means, and said joint-overlying channel members of said top panels are disposed in a staggered configuration relative to said joint-overlying channel section members of said bottom panels and in a staggered configuration relative to joint-overlying channel section members of said side panels.

19. In ducting according to claim 1 further comprising sealing means placed between ends of two adjacent in line said panels and between said panels and joint-overlying channel section members.

20. In ducting according to claim 1 further comprising sealing means interposed between rounded fold lines in said panels and joint-covering channel section members.

21. In ducting according to claim 1 further comprising sealing means interposed between each of said rims of said channel panels and said margins of flat panels.

* * * * *